G. E. ACKLOM.
Refrigerator.
No. 199,891.  Patented Feb. 5, 1878.
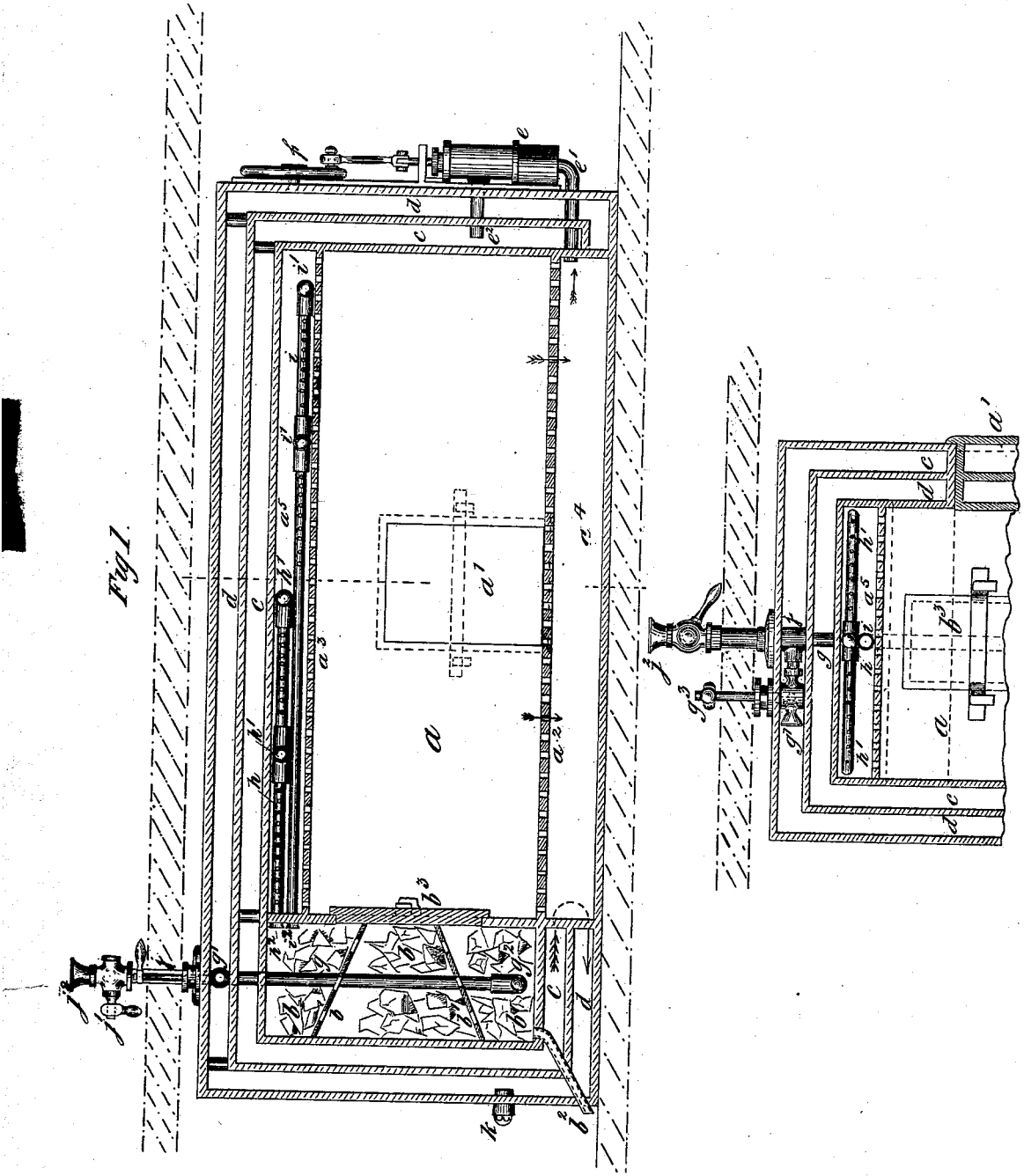

UNITED STATES PATENT OFFICE.

GEORGE E. ACKLOM, OF CHELTENHAM, ENGLAND.

IMPROVEMENT IN REFRIGERATORS.

Specification forming part of Letters Patent No. 199,891, dated February 5, 1878; application filed June 28, 1877; patented in England September 15, 1877.

*To all whom it may concern:*

Be it known that I, GEORGE EVATT ACKLOM, of Cheltenham, in the county of Gloucester, England, have invented a new and useful improved apparatus for use in preserving animal and vegetable matters during storage or transit, which improvement was patented in England, sealed September 15, 1877, No. 1,157, and is fully set forth in the following specification, reference being had to the accompanying drawings.

The object of the invention is economy in the use of the refrigerating means.

That the invention may be the better understood, I will, by the aid of the accompanying drawings, proceed to describe an arrangement of apparatus I employ for the purpose.

Referring to the drawing, Figure 1 shows a longitudinal section of such apparatus; and Fig. 2, a portion of a transverse section thereof.

In both figures the same letters are employed to indicate corresponding parts.

$a$ represents the chamber in which is to be placed the animal or vegetable matters to be preserved, and $a^1$ the door or cover for entrance thereto.

The ice or other matter used as the refrigerating means is placed in the chamber $b$, where, to facilitate the more equal distribution of it, there are provided perforated shelves $b^1$, on which blocks of the ice may rest, while the perforations admit of the free passage downward, and thence out by the pipe $b^2$, of any water from the ice.

$b^3$ is a door from the chamber $a$ to the ice-chamber $b$. $c$ and $d$ are chambers or jackets surrounding both the chambers $a$ and $b$, for the purpose of receiving cold air to aid in keeping down the temperature of the compartments $a$ and $b$.

Both the floor $a^2$ and the ceiling $a^3$ of the chamber $a$ are perforated with numerous small holes. The object of the perforations in the floor $a^2$ is that the air from the chamber $a$ may freely circulate in the chamber $a^4$ below, to be thence withdrawn at intervals, when required, by any suitable pumping apparatus, $e$.

This pumping apparatus may be worked by a steam-engine or other suitable power, or by a winch-handle applied to the wheel $f$, and the air withdrawn by the apparatus $e$ through the pipe $e^1$ from the chamber $a^4$ will be forced by the pipe $e^2$ into the chamber $c$, and thence to the chamber $d$, as shown by the curved arrow in Fig. 1, there being no direct communication between the chamber $a^4$ and the chambers $c$ $d$, because the passage of air is outside the solid side wall which incloses the chambers $a$ and $a^4$, and from the chamber $d$ by an opening, $g^1$, into the pipe $g$, down which it will be conducted to the lower cross or inverted-T piece $g^2$ thereof, which is perforated with numerous small holes, through which the air is allowed to escape and to rise up in the chamber $b$, and in doing so it becomes cooled by the action of the ice thereon as it rises up between the blocks or lumps of ice. The air thus cooled by the ice in the chamber $b$ is thence conducted, by the longitudinal and transverse perforated pipes $h$ and $h^1$ and $i$ and $i^1$, into the chamber $a^5$ formed over the perforated ceiling $a^3$ of the chamber $a$, to replenish the chamber $a$.

The bell-shaped mouths $h^2$, $i^2$, and $j^2$ of the pipes $h$, $i$, and $j$ may be covered with felt or other filtering material.

$j$ is a passage with a bell-mouth opening, $j^2$, from the external air to the upper part of the pipe $g$, by which, when required, a fresh supply of external air may be drawn in to fill the respective chambers. This passage $j$ is opened or closed by means of the tap or valve $j^1$, and, when open, the passage into the pipe $g$ from the jackets is closed by a tap or valve, $g^3$. By these means the air employed is caused to perform a double duty—that is to say, after having been for a time utilized in the chamber $a$, it is caused to circulate through the surrounding chambers or jackets to exclude access of heat from without to the chamber $a$, and, when desired, fresh atmospheric air may be drawn in by the valve $j^1$ to replace that which has been utilized.

$k$ is an escape-valve for the escape of excess of air from the chambers $c$ and $d$.

By reducing the passage of air to intervals of time—say, to two hours out of every twenty-four—instead of having it continuous, economy of the ice will result.

Having now described my invention, I claim—

The apparatus, constructed substantially as described, consisting of the chambers or jackets $c\ d$, the interior chamber $a$, having perforated floor and ceiling, the ice-chamber $b$, the fresh-air passage $j$, foul-air-exit valve $k$, and pumping apparatus $e$, and for the purposes set forth.

In testimony whereof I have signed my name to this specification in the presence of two subscribing witnesses.

GEORGE EVATT ACKLOM.

Witnesses:
  WILLIAM BROOKES,
  ALFRED GEORGE BROOKES.